(12) United States Patent
Gehm et al.

(10) Patent No.: US 7,450,021 B1
(45) Date of Patent: Nov. 11, 2008

(54) VACUUM SYSTEM CAPACITY ANALYZER

(76) Inventors: Lanny Gehm, 9502 Rte. 79, Lisle, NY (US) 13797; William Gehm, 149 Abbott Rd., Lisle, NY (US) 13797

( * ) Notice: Subject to any disclaimer, the term of this patent is extended or adjusted under 35 U.S.C. 154(b) by 835 days.

(21) Appl. No.: 10/935,761

(22) Filed: Sep. 7, 2004

(51) Int. Cl.
   *G08B 21/00* (2006.01)
(52) U.S. Cl. ............... 340/626; 340/540; 119/14.01; 119/14.14; 119/14.15; 137/557; 73/753; 73/754
(58) Field of Classification Search .......... 340/626, 340/606, 611, 614, 540; 114/14.01, 14.14, 114/14.15; 137/557; 73/753, 754
   See application file for complete search history.

(56) References Cited

U.S. PATENT DOCUMENTS 4,616,215 A   10/1986  Maddalena
5,617,338 A *  4/1997  Sugano et al. ............. 702/140
2005/0204824 A1* 9/2005 Goodman .................... 73/753

\* cited by examiner

*Primary Examiner*—George A Bugg
*Assistant Examiner*—Travis R Hunnings
(74) *Attorney, Agent, or Firm*—Mark Levy; Hinman, Howard & Kattell

(57) ABSTRACT

There is provided a method for monitoring a vacuum system such as that used in a dairy milking system. Several independent measurements are made whereby a long term degradation of the vacuum pump or other component in the vacuum system may be identified before system performance drops below acceptable limits. Baseline data generated when the vacuum system is known to be in good working order. The baseline data is used to compare operation of the vacuum system. An alarm signal or other indication may be generated to alert an operator that vacuum system performance has degraded beyond an acceptable limit. Such predictive failure techniques allow maintenance to be performed on the vacuum system long before performance degrades to a point where a system becomes inoperative.

11 Claims, 3 Drawing Sheets

VACUUM SYSTEM CAPACITY ANALYZER

FIELD OF THE INVENTION

The invention pertains to monitoring devices for vacuum systems and, more particularly, to a device which monitors a vacuum system and alerts an operator when degradation of the vacuum system is detected.

BACKGROUND OF THE INVENTION

Vacuum-operated devices generally require a minimum vacuum capacity, typically measured in volumetric flow of air per unit time, to ensure their proper operation. Consequently, vacuum systems supplying vacuum to such devices must likewise maintain sufficient vacuum capacity.

Typically vacuum within a vacuum system is produced by a vacuum pump, several types of vacuum pumps being well known to those of skill in the art. In a vacuum system, the vacuum pump must be designed and sized to ensure enough capacity. That is, the vacuum pump must be capable of providing more air flow than the system requires.

Vacuum systems typically include some means for regulating the vacuum level (i.e., holding the vacuum level between predetermined limits). This is typically accomplished either by using a regulator that admits air in a controlled manner or by varying the speed of the vacuum pump to produce the required instantaneous vacuum.

However, as vacuum pumps and other components in a vacuum system age, several problems may occur. These problems result in a decrease in vacuum capacity of the system. Problems such as mechanical wear and degradation of the pump, leaks in the system, or failure of the vacuum regulator are typical. The loss of vacuum capacity can occur gradually over time leading to slow erosion of the vacuum capacity margin of the system and subsequent degradation in the performance of vacuum-using devices attached to the system.

For example, one common usage of vacuum systems is in milking systems designed for milking dairy cows or other milk-producing animals. These milking systems consist of a vacuum pump, a regulator, and a collection of interconnecting pipes and milking machines that utilize the vacuum to milk cows. The process of milking the cows typically creates a widely varying vacuum demand. The vacuum pump must have the ability to respond to that changing demand in a timely manner.

If, however, the vacuum pump or other components of the vacuum system begin to degrade, then the performance of the milking system may be degraded. This degradation can occur over a period of time and may not be readily recognized by the operators until a catastrophic or near-catastrophic failure occurs. However, the result is generally poor milking performance of the milking system.

DISCUSSION OF THE RELATED ART

U.S. Pat. No. 4,616,215 for VACUUM MONITORING AND SIGNALING APPARATUS, issued Oct. 7, 1986 to Richard E. Maddalena teaches a vacuum monitoring apparatus having an alarm when a vacuum level falls outside a preset range. MADDALENA, however, makes no provision for monitoring trends over a period of time in an effort to detect degradation in a vacuum system.

It would, therefore, be extremely beneficial to the operators of such milking systems to become aware of the degradation of performance of the vacuum system before the degradation seriously affects milking performance. It would be beneficial to provide a system capable of monitoring the capacity of the vacuum system and notifying an operator of any reduction in capacity.

SUMMARY OF THE INVENTION

In accordance with the present invention there is provided a method for monitoring a vacuum system such as is used in a dairy milking system. Several independent measurements including, but not limited to mass flow, are made whereby long term degradation of the vacuum pump or other components in the vacuum system may be identified before system performance drops below acceptable limits.

It is, therefore, an object of the invention to provide a method of monitoring vacuum levels in a vacuum system.

It is a further object of the invention to provide a method of monitoring vacuum levels that is useful for operators of a dairy milking parlor.

It is another object of the invention to provide a method of monitoring vacuum wherein gradual degradation of a vacuum system may be detected.

It is a further object of the invention to provide a method of monitoring vacuum wherein historic ratios of pressures may be compared to present ratios of pressures to detect degradation in a vacuum system.

It is an additional object of the invention to provide a method of monitoring vacuum wherein the amount of time necessary to bring a vacuum level to a predetermined point at startup of the vacuum system is used to determine the health thereof.

It is a still further object of the invention to provide a method of monitoring vacuum wherein a difference in pressure in a regulated and a non-regulated portion of a vacuum system is used to assess the efficiency thereof.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Figure 1:
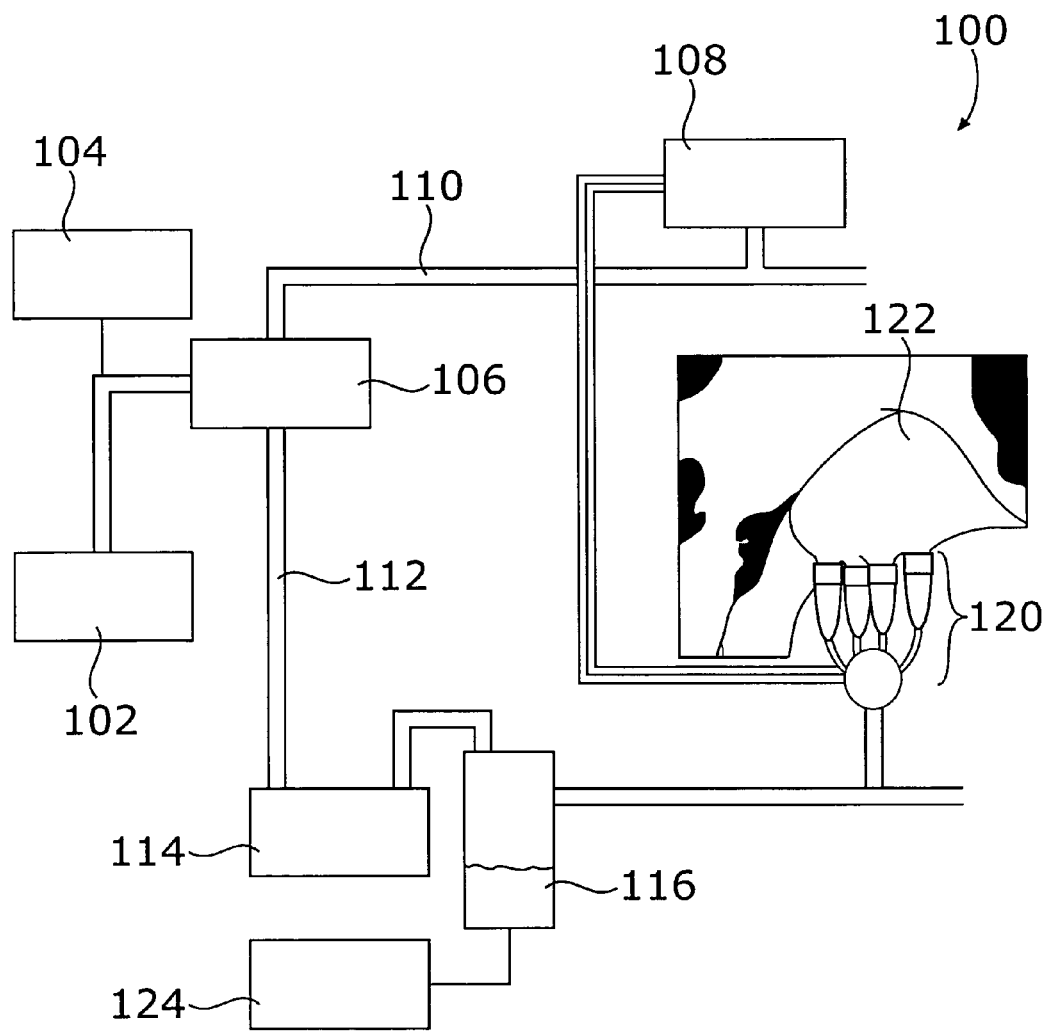
FIG. 1 is a schematic diagram of a vacuum system of a typical dairy milking system.

Referring first to FIG. 1, there is shown a system schematic diagram of a portion of a typical milking system, generally at reference number 100. A vacuum pump 102 is connected to a vacuum regulator 104 and to a vacuum header or distribution manifold 106. Vacuum pump 102 may be of any type well known to those of skill in the art of vacuum systems, such as Model No. M7.5, manufactured by Masport, Inc., the exact specification of vacuum pump 102 forming no part of the instant invention. Vacuum regulator 104 is shown schematically as a bypass regulator, such as Model No. 350, manufactured by Western Dairy Research, Inc., but any other form of vacuum regulator such as an in-line regulator or a variable-speed vacuum pump drive system may also be used.

A pulsator 108 is connected to header 106 by pulsation line 110. Main vacuum line 112 connects header 106 to a milk receiver 116 via a moisture trap 114. Milk receiver 116 is shown connected to a milk line 118 which is, in turn connected to milking machine 120 shown connected to the teats of an animal 122. Milk pump 124 pumps milk from milk receiver 116 to a holding tank, not shown, for further processing.

A typical milking system such as that shown in FIG. 1 may have hundreds of feet of vacuum lines and many interconnections. Consequently, there are numerous points where vacuum leakage may occur. While vacuum regulator 104 normally keeps the vacuum level within predetermined limits, no vacuum monitoring tracks either the instantaneous or long-term performance. Developing leaks or degradation of vacuum pump 102 or vacuum regulator 104, therefore, can not be detected until the milking performance is badly degraded.

The method of the present invention provides comprehensive vacuum system monitoring to detect the earliest stages of system performance degradation, whether from developing leaks or from degradation of a system component. The vacuum system capacity is monitored and evaluated in a number of independent ways.

Figure 2:
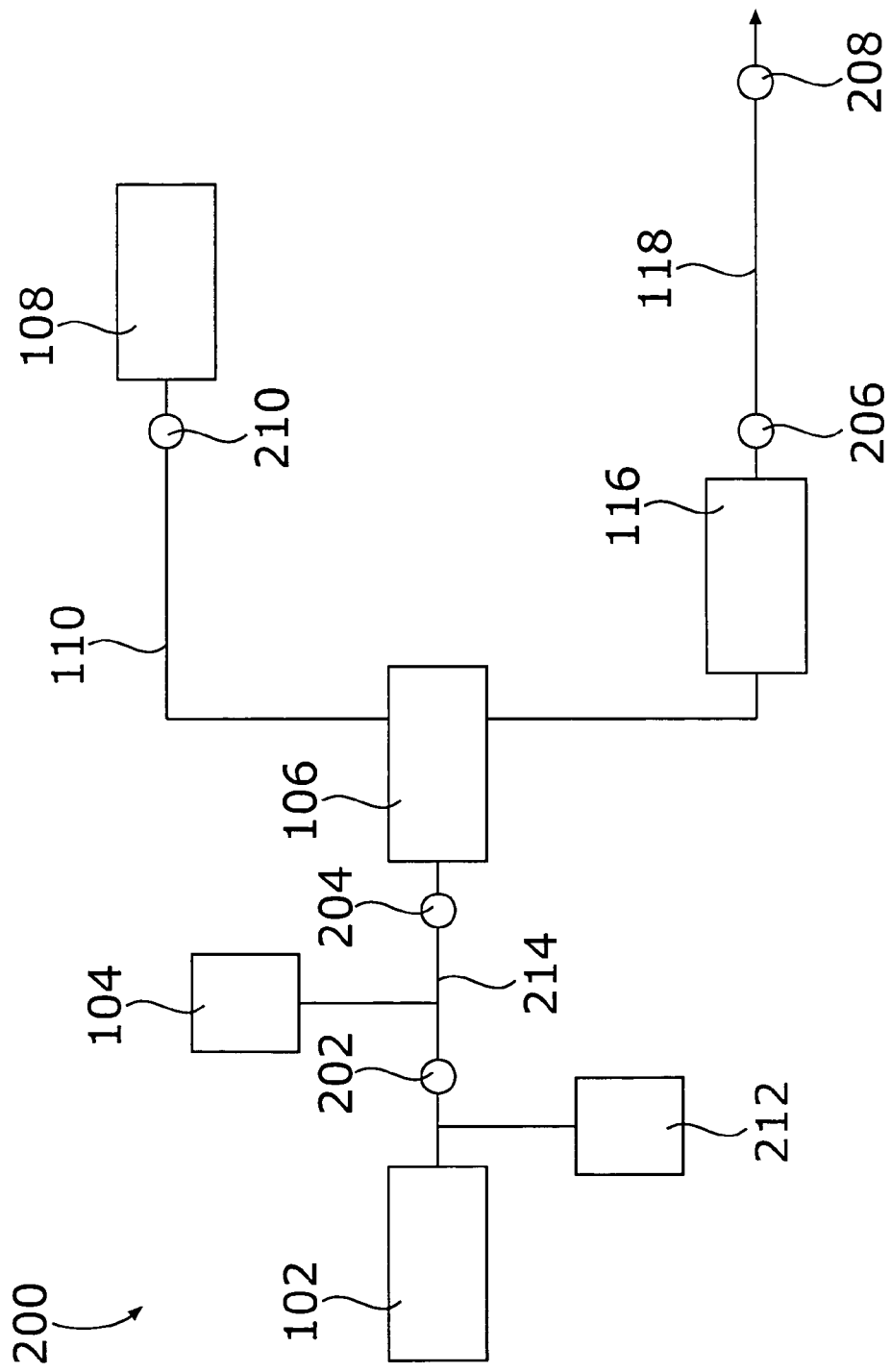
FIG. 2 is a simplified schematic diagram of the vacuum system of FIG. 1, having vacuum monitoring devices in accordance with the present invention.

Referring now to FIG. 2, there is shown a simplified version of the milking system of FIG. 1, having vacuum monitoring devices in accordance with the present invention. Vacuum pump 102, vacuum regulator 104, header 106, pulsator 108 and milk receiver 116 are still present in the same arrangement as described hereinabove.

A vacuum sensor 202 is shown disposed in vacuum line 214 adjacent vacuum pump 102 but before the point vacuum regulator 104 is connected. Another vacuum sensor 204 is placed leader 204, typically relatively close to regulator 104. Additional vacuum sensors 206, 208 are disposed in vacuum line 118. Still another vacuum sensor 210 is placed in pulsation line 110. Vacuum sensors are off-the-shelf commercial vacuum sensors adapted to produce an electrical output representative of a vacuum level present thereat. A model no. PX241 vacuum sensor, manufactured by Omega or equivalent, has been found satisfactory for the application. Although not specifically shown in FIG. 2, vacuum sensors 202, 204, 206, 208, 210 are each electrically connected to a monitor 300 (FIG. 3) as described in detail hereinbelow.

An air admission device 212 is attached to vacuum line 214, also adjacent vacuum pump 102 and before the point of attachment of vacuum regulator 104. Air admission device 212 is designed to open vacuum line 214 to a predetermined amount of air and may be a solenoid-operated valve with a calibrated orifice, not shown. The orifice may have either a fixed or variable diameter, depending upon the actuation method used. Any other device through which a predetermined amount of air may be admitted to vacuum line 214 may be utilized. Air admission device 212 is also operatively connected to controller 300 as described hereinbelow.

It will be recognized that while five vacuum sensors have been shown for purposes of disclosure, other numbers of sensors, even as few as one sensor, may be required depending upon the size and complexity of the vacuum system installed in a particular milking parlor. In fact, no sensor is required when the system operates on the basis of mass flow. Also, while the vacuum system of a milking parlor has been chosen to describe the inventive methods, these methods are also applicable to vacuum systems in other environments.

Figure 3:
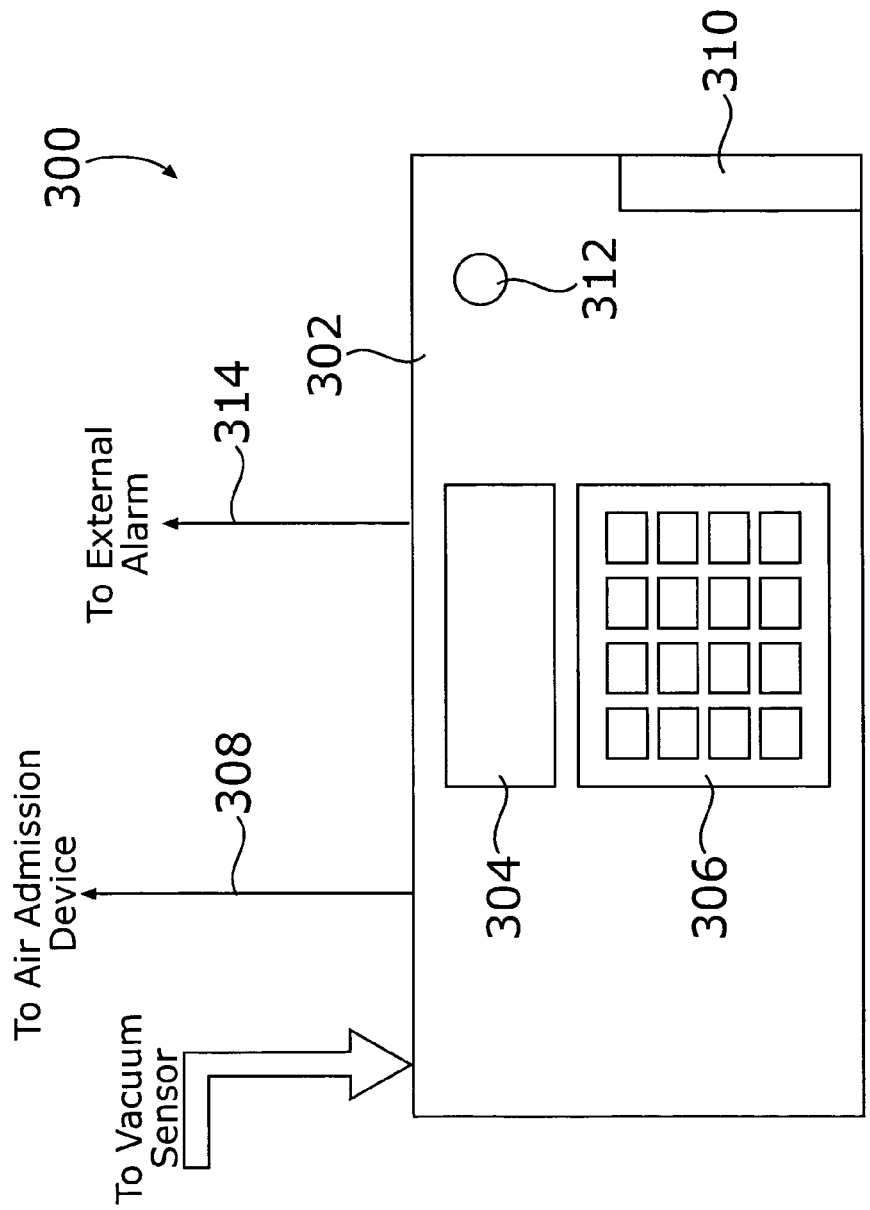
FIG. 3 is a schematic view of a possible monitoring device for practicing the method of the invention.

Referring now to FIG. 3, there is shown a schematic diagram of a monitoring and control system suitable for practicing the method of the invention, generally at reference number 300. A monitor/controller 302, hereinafter controller, is schematically shown. As will be recognized by those of skill in the art, controller 302 may be implemented in many configurations and the invention is not considered limited to the exact controller 302 shown for purposes of disclosure. Controller 302 accepts electrical output signals from vacuum sensors 202, 204, 206, 208, 210 (FIG. 2) and using signal conditioning and/or conversion circuitry, not shown, converts incoming electrical signals to actual vacuum readings. These readings may be selectively provided on a display 304. A keypad 306 may be used to monitor individual ones of sensors 202, 204, 206, 208, 210 and/or a flow meter, not shown, placed, for example, between vacuum regulator 104 and vacuum pump 102.

Key pad 304 or programming interface 310 may be used to preload acceptable ranges for each of vacuum sensors 202, 204, 206, 208, 210 typically when the vacuum system is first installed.

A control output 308 is provided to electrically actuate air intake device 212 (FIG. 2) upon command from controller 302. It will be recognized that while electrical actuation of air intake device 212 has been chosen for purposes of disclosure, mechanical, hydraulic, or pneumatic action could also be used to accomplish the actuation.

It is anticipated that controller 302 is a microprocessor-based controller utilizing non-volatile memory to store instructions, fixed data, and accumulated data from the vacuum sensors 202, 204, 206, 208, 210.

Controller 302 implements several different monitoring functions. In a first monitoring method, air intake device 212 is periodically activated. The effect of this activation on the vacuum level at sensor 204 or another of vacuum sensors 206, 208, 210 (i.e., in the controlled section of the vacuum system) is observed. If measured vacuum at sensor 204, etc. does not drop below a predetermined value, the capacity of the system is deemed to be acceptable. In other words, vacuum pump 102 and vacuum regulator 104 are probably both operating properly and it is likely that no significant leaks occur in the vacuum system. The acceptable vacuum level is predetermined, typically at the time the monitored system 200 is installed.

If, however, the actuation of air intake device 212 causes vacuum loss at sensor 204, etc., an alarm is generated. This alarm may be a visual indicator 312 or an internal, audible alarm, not shown. In addition, an alarm signal line 314 may be used to actuate a remote alarm.

Another measurement of vacuum system status is performed by controller 302 as the vacuum system is first started. The time necessary for the vacuum level to rise from approximately 10% to approximately 90% of the nominal vacuum level can be measured. The measurement of this slew rate is another way of evaluating the overall health and integrity of the vacuum system. As described, an unacceptable slew rate at vacuum system startup may trigger an alarm.

Another way in which the inventive system may monitor vacuum system health is by developing statistics regarding normal vacuum excursions and establishing a baseline of normal vacuum system behavior and, optionally, evaluating the statistics to determine trends. Controller 302 may then monitor vacuum level excursions on an ongoing basis and evaluate excursions to determine the fall in an acceptable range of values.

Still another way the method of the invention uses to evaluate vacuum system health is to monitor total mass flow rate, which should remain within a predetermined set of limits. Mass flow rate is easily monitored by readily available commercial products. A typical mass flow measurement consists of a rotary vane placed in the air (or vacuum) stream to be measured. Rotation of the vane is easily monitored and correlated to the mass flow of the air stream causing the van rotation.

Another method of evaluating vacuum system performance is to compare the vacuum level at or near the vacuum pump 102 (e.g., at vacuum sensor 202) to the vacuum level on the regulated side of the system (e.g., at one of vacuum sensors 204, 208, 208, 210). That ratio should remain relatively constant if the capacity of vacuum pump 102 has not been reduced or if the vacuum system 200 otherwise has not been degraded.

Another method of assessing the performance of the vacuum system 200 is to compare the vacuum level of remote sections of the system (e.g., at vacuum sensors 206, 208, 210) to the area near the vacuum regulator (e.g., vacuum sensor 204). Again, that ratio should remain within specific limits if the vacuum system 200 is operating at a normal, acceptable capacity (i.e., vacuum system 200 is not degraded).

Since other modifications are changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. A method of monitoring the performance of a vacuum system, the steps comprising:
   a) providing a vacuum system comprising a vacuum pump, a vacuum regulator and a vacuum load, all interconnected to one another by a vacuum line;
   b) placing an upstream vacuum sensor in a portion of said vacuum line proximate said vacuum pump but before said vacuum regulator, said upstream vacuum sensor generating an output signal representative of a vacuum level in said vacuum line proximate said upstream vacuum sensor;
   c) placing a downstream vacuum sensor along said vacuum line between said regulator and said vacuum load, said downstream vacuum sensor generating an output signal representative of a vacuum level thereat;
   d) comparing said output signal from at least one of: said upstream vacuum sensor and said downstream vacuum sensor with respect to at least one of: time, and said output signal from at least one other of said upstream vacuum sensor and said downstream vacuum sensor, and generating a comparison output signal representatives of a result of said comparison; and
   e) providing an indication to an operator if said comparison output signal falls outside a predetermined range of values.

2. The method for monitoring the performance of a vacuum system as recited in claim 1, wherein said comparing step (d) comprises comparing said output signal from at least one of said upstream vacuum sensor and said downstream vacuum sensor with at least one of: a signal of another one of said upstream vacuum sensor or said downstream vacuum sensor, and a previously stored value corresponding to a signal from at least one of said upstream vacuum sensor and said downstream vacuum sensor while periodically admitting air into said vacuum line at a point between said vacuum pump and said vacuum regulator.

3. The method for monitoring the performance of a vacuum system as recited in claim 1, wherein said comparing step (d) comprises comparing said output signal from upstream vacuum sensor with said output signal from said downstream vacuum sensor while periodically admitting air into said vacuum line at a point between said vacuum pump and said vacuum regulator.

4. The method for monitoring the performance of a vacuum system as recited in claim 1, the steps further comprising:
   a) providing at least one additional downstream vacuum sensor;
   b) periodically measuring said output signals of at least two different ones of said downstream vacuum sensors when said vacuum system is known to be in normal working order and establishing a baseline value of a ratio therebetween; and
   c) after said baseline is established, measuring said output signals of said two different ones of downstream vacuum sensors and comparing a ratio therebetween to said baseline ratio and generating an output if said measured ratio deviates from said baseline ratio by more than a predetermined amount.

5. The method for monitoring the performance of a vacuum system as recited in claim 4, the steps further comprising detecting a trend dependent on statistics generated by said monitoring method.

6. A method of monitoring the performance of a vacuum system, the steps comprising:
   a) providing a vacuum system comprising a vacuum pump, a vacuum regulator and a vacuum load, all interconnected to one another by a vacuum line;
   b) placing at least one vacuum sensor in said vacuum line, said at least one vacuum sensor generating an output signal representative of a vacuum level in said vacuum line proximate said vacuum sensor;
   c) periodically introducing a predetermined amount of air into said vacuum line at a point between said vacuum pump and said vacuum regulator; and
   d) providing an indication to an operator if said vacuum level output signal falls outside a predetermined range of values.

7. The method for monitoring the performance of a vacuum system as recited in claim 6, wherein said periodically introducing air step (c) comprises using a fixed-diameter opening to admit said air.

8. A method of monitoring the performance of a vacuum system, the steps comprising:
   a) providing a vacuum system comprising a vacuum pump, a vacuum regulator and a vacuum load, all interconnected to one another by a vacuum line;
   b) placing a vacuum sensor in said vacuum line, said vacuum sensor generating an output signal representative of a vacuum level in said vacuum line proximate said vacuum sensor;
   c) measuring said output signal of said vacuum sensor to determine a time required for a vacuum level to move from approximately 10% of a nominal, operating vacuum level to approximately 90% of said nominal, operating vacuum level;
   d) comparing said time determined in said measuring step (c) to a predetermined time; and
   e) providing an indication to an operator if said time falls outside a predetermined range of time values.

9. A method of monitoring the performance of a vacuum system, the steps comprising:
   a) providing a vacuum system comprising a vacuum pump, a vacuum regulator and a vacuum load, all interconnected to one another by a vacuum line;
   b) placing a first vacuum sensor in said vacuum line, said first vacuum sensor generating an output signal representative of a vacuum level in said vacuum line proximate said first vacuum sensor;

c) placing a second vacuum sensor along said vacuum line, said second vacuum sensor generating an output signal representative of a vacuum level thereat;

d) comparing said output signal from at least one of: said first vacuum sensor and said second vacuum sensor with respect to at least one of: time, and said output signal from at least one other of said first vacuum sensor and said second vacuum sensor, and generating a comparison output signal representatives of a result of said comparison;

e) providing an indication to an operator if said comparison output signal falls outside a predetermined range of values;

f) periodically measuring said output signal from at least one of said first vacuum sensor and said second vacuum sensor when said vacuum system is known to be in normal working ordering and establishing a baseline value of acceptable vacuum ratios; and g) after said baseline is established, comparing a measured vacuum excursion to said baseline and generating an output signal if said measured vacuum excursion deviates from said baseline by more than a predetermined amount.

10. The method for monitoring the performance of a vacuum system as recited in claim 9, the steps further comprising detecting a trend dependent on statistics generated by said monitoring method.

11. A method of monitoring the performance of a vacuum system, the steps comprising:

a) providing a vacuum system comprising a vacuum pump, a vacuum regulator and a vacuum load, all interconnected to one another by a vacuum line;

b) providing a predetermined acceptable value of mass flow rate of air to be moved by said vacuum system;

c) measuring a mass flow rate of air currently being moved by said vacuum system;

d) comparing said measured mass flow rate to said predetermined, acceptable value of mass flow rate and generating an output signal when said measured mass flow rate deviates from said predetermined, acceptable value by more than a predetermined amount; and e) providing an indication to an operator if said comparison output signal falls outside a predetermined range of values.

* * * * *